United States Patent
Post et al.

(10) Patent No.: US 11,822,681 B1
(45) Date of Patent: Nov. 21, 2023

(54) DATA PROCESSING SYSTEM WITH VIRTUAL MACHINE GROUPING BASED ON COMMONALITIES BETWEEN VIRTUAL MACHINES

(71) Applicant: UIPCO, LLC, San Antonio, TX (US)

(72) Inventors: Nathan Lee Post, San Antonio, TX (US); Ryan Thomas Russell, San Antonio, TX (US); Bryan J. Osterkamp, New Braunfels, TX (US); William Preston Culbertson, II, San Antonio, TX (US); Courtney St. Martin, Roswell, GA (US); Ashley Raine Philbrick, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 570 days.

(21) Appl. No.: 16/721,316

(22) Filed: Dec. 19, 2019

Related U.S. Application Data

(60) Provisional application No. 62/786,898, filed on Dec. 31, 2018.

(51) Int. Cl.
*G06F 21/62* (2013.01)
*G06F 21/53* (2013.01)
*G06F 9/455* (2018.01)

(52) U.S. Cl.
CPC ...... *G06F 21/6209* (2013.01); *G06F 9/45558* (2013.01); *G06F 21/53* (2013.01);
(Continued)

(58) Field of Classification Search
CPC ......... G06F 2009/4557; G06F 9/45558; G06F 21/53; G06F 21/6209; G06F 2009/45575;
(Continued)

(56) References Cited

U.S. PATENT DOCUMENTS

| | | | |
|---|---|---|---|
| 5,682,507 A | 10/1997 | Phillips et al. | |
| 9,116,803 B1 * | 8/2015 | Agrawal | G06F 11/0751 |

(Continued)

OTHER PUBLICATIONS

Office Action dated Oct. 9, 2020 in U.S. Appl. No. 16/593,877.
(Continued)

*Primary Examiner* — Dao Q Ho
(74) *Attorney, Agent, or Firm* — Plumsea Law Group, LLC

(57) ABSTRACT

A data processing system may include a plurality of host servers, each server including a device processor and a non-transitory computer readable medium including instructions stored thereon and executable by the processor, wherein the computer readable medium of each server includes instructions for running one or more virtual machines. In addition, the system may include a system controller including a device processor and a non-transitory computer readable medium including instructions stored thereon and executable by the processor, the computer readable medium of the system controller including instructions for receiving commands to host two or more virtual machines on the plurality of host servers; making a determination as to which of the virtual machines share commonalities with one another; and based on the determination, providing instructions to the plurality of host servers to host virtual machines determined to share one or more commonalities with one another on the same host server.

14 Claims, 11 Drawing Sheets

(52) U.S. Cl.
CPC .............. *G06F 2009/45575* (2013.01); *G06F 2009/45587* (2013.01); *G06F 2009/45595* (2013.01)

(58) Field of Classification Search
CPC ............ G06F 2009/45587; G06F 2009/45595; G06F 2009/45583
See application file for complete search history.

(56) References Cited

U.S. PATENT DOCUMENTS

| | | | |
|---|---|---|---|
| 9,197,489 B1* | 11/2015 | Vincent | H04L 67/148 |
| 9,304,797 B2* | 4/2016 | Umezawa | G06F 9/44505 |
| 10,628,194 B2* | 4/2020 | Ryu | G06F 9/45558 |
| 11,226,773 B1* | 1/2022 | Patel | G06F 9/455 |
| 2002/0129176 A1 | 9/2002 | Bolmarcich et al. | |
| 2007/0121631 A1* | 5/2007 | Krikorian | G06F 9/546 |
| | | | 370/392 |
| 2009/0249472 A1 | 10/2009 | Litvin et al. | |
| 2011/0055602 A1 | 3/2011 | Kamay et al. | |
| 2011/0072293 A1 | 3/2011 | Mazzaferri et al. | |
| 2011/0142053 A1* | 6/2011 | Van Der Merwe | H04L 47/781 |
| | | | 370/395.1 |
| 2011/0197039 A1 | 8/2011 | Green et al. | |
| 2011/0225459 A1* | 9/2011 | Fahrig | G06F 11/366 |
| | | | 718/1 |
| 2012/0084262 A1 | 4/2012 | Dwarampudi et al. | |
| 2012/0304170 A1* | 11/2012 | Morgan | G06F 9/45558 |
| | | | 718/1 |
| 2013/0263208 A1* | 10/2013 | Challa | G06F 9/45558 |
| | | | 718/1 |
| 2013/0275592 A1 | 10/2013 | Xu et al. | |
| 2013/0275973 A1* | 10/2013 | Greenfield | G06F 9/44584 |
| | | | 718/1 |
| 2013/0290513 A1 | 10/2013 | Shikari et al. | |
| 2014/0189685 A1 | 7/2014 | Kripalani | |
| 2014/0282522 A1* | 9/2014 | Daly | G06F 9/45558 |
| | | | 718/1 |
| 2015/0007176 A1* | 1/2015 | Kotani | G06F 11/3433 |
| | | | 718/1 |
| 2016/0048408 A1* | 2/2016 | Madhu | H04L 47/783 |
| | | | 718/1 |
| 2016/0125059 A1 | 5/2016 | Jain et al. | |
| 2016/0179184 A1 | 6/2016 | Shah et al. | |
| 2016/0323245 A1 | 11/2016 | Shieh et al. | |
| 2017/0063801 A1* | 3/2017 | Faynberg | H04L 63/0281 |
| 2019/0025903 A1 | 1/2019 | Mehta et al. | |
| 2019/0050046 A1 | 2/2019 | Gupta et al. | |
| 2019/0272016 A1 | 9/2019 | Frias et al. | |
| 2020/0034173 A1* | 1/2020 | Rosenberg | G06F 9/5088 |
| 2020/0183725 A1* | 6/2020 | Grehan | G06F 1/30 |

OTHER PUBLICATIONS

Office Action dated Mar. 8, 2021 in U.S. Appl. No. 16/593,877.
Office Action dated Jun. 22, 2020 in U.S. Appl. No. 16/593,877.
Office Action dated Oct. 4, 2021 in U.S. Appl. No. 16/593,554.

* cited by examiner

US 11,822,681 B1

DATA PROCESSING SYSTEM WITH VIRTUAL MACHINE GROUPING BASED ON COMMONALITIES BETWEEN VIRTUAL MACHINES

CROSS-REFERENCE TO RELATED APPLICATIONS

This application claims priority to U.S. Provisional Patent Application No. 62/786,898, filed Dec. 31, 2018, the entire disclosure of which is hereby incorporated by reference.

TECHNICAL FIELD

The present disclosure generally relates to data processing systems and, more particularly, to systems and methods for configuring data processing systems.

BACKGROUND

Electronic equipment typically generates heat. Indoor areas that house multiple pieces of electronic equipment (such as server rooms, data centers, etc.) can generate significant amounts of heat such that the indoor areas require climate control, such as cooling. Air conditioning and other kinds of cooling measures, such as ventilation, fans, etc., are often used to ensure that the equipment does not overheat.

In some cases, applications and/or virtual machines that communicate with one another in the same data center may be hosted on different host servers. This means that all communication between such applications/virtual machines must pass through one or more physical or virtual security components, such as physical or virtual firewalls. This reduces efficiency and/or speed of the communication and data processing, and may also generate additional heat as compared to communications between applications/virtual machines hosted on the same host server.

In addition, applications/virtual machines having commonalities are often hosted on different host servers. Further, in some cases, applications/virtual machines may be hosted on the same host server with other applications virtual machines with which there are no commonalities. This also reduces efficiency and/or speed of the communication and data processing, and may also generate additional heat as compared to hosting applications/virtual machines on the same host server.

Also, server clusters are typically operated to spread out the processing duties substantially evenly among all servers in the cluster. However, during times when minimal processing is required, large amounts of energy may be used by keeping all servers in the cluster operating at full power. Further, operating all servers in the cluster operating at full power may generate additional heat.

There is a need in the art for a system and method that addresses the shortcomings discussed above. In particular, there is a need in the art for a disaster condition monitoring system.

SUMMARY

In one aspect, the present disclosure is directed to a data processing system. The system may include a plurality of host servers, each host server including a device processor and a non-transitory computer readable medium including instructions stored thereon and executable by the processor. The computer readable medium of each server includes instructions for running one or more application, wherein the plurality of host servers are networked in communication with one another. The system further includes a system controller networked with the plurality of host servers and including a device processor and a non-transitory computer readable medium including instructions stored thereon and executable by the processor, wherein the computer readable medium of the system controller includes instructions for performing the following steps: receiving commands to run two or more applications on the plurality of host servers; making a determination as to which of the two or more applications communicate with one another during operation; and based on the determination, providing instructions to the plurality of host servers to run running applications determined to communicate with one another on the same host server.

In another aspect, the present disclosure is directed to a data processing system. The system may include a plurality of machines, each machine including a device processor and a non-transitory computer readable medium including instructions stored thereon and executable by the processor, wherein the computer readable medium of each machine includes instructions for running one or more application, and wherein the plurality of machines are networked in communication with one another. The system may also include a system controller networked with the plurality of machines and including a device processor and a non-transitory computer readable medium including instructions stored thereon and executable by the processor, wherein the computer readable medium of the system controller includes instructions for performing the following steps: receiving commands to run two or more applications on the plurality of machines; making a determination as to which of the two or more applications communicate with one another during operation; and based on the determination, providing instructions to the plurality of machines to run applications determined to communicate with one another on the same machine.

In another aspect, the present disclosure is directed to a method of configuring a data processing system. The method may include receiving commands, with a system controller networked with a plurality of machines, to run two or more applications on a plurality of machines networked in communication with one another, each machine including a device processor and a non-transitory computer readable medium including instructions stored thereon and executable by the processor. The method may also include determining, with the system controller, which of the two or more applications communicate with one another during operation; and the system controller providing instructions to the plurality of machines to run applications determined to communicate with one another on the same machine.

In another aspect, the present disclosure is directed to a data processing system. The system may include a plurality of host servers, each server including a device processor and a non-transitory computer readable medium including instructions stored thereon and executable by the processor, wherein the computer readable medium of each server includes instructions for running one or more virtual machines, and wherein the plurality of host servers are networked in communication with one another. In addition, the system may include a system controller networked with the plurality of host servers and including a device processor and a non-transitory computer readable medium including instructions stored thereon and executable by the processor, wherein the computer readable medium of the system controller includes instructions for performing the following steps: receiving commands to host two or more virtual machines on the plurality of host servers; making a determination as to which of the two or more virtual machines share commonalities with one another; and based on the determination, providing instructions to the plurality of host servers to host virtual machines determined to share one or more commonalities with one another on the same host server.

In another aspect, the present disclosure is directed to a data processing system. The system may include a plurality of machines, each machine including a device processor and a non-transitory computer readable medium including instructions stored thereon and executable by the processor, wherein the computer readable medium of each machine includes instructions for running one or more virtual machines, and wherein the plurality of machines are networked in communication with one another. The system may also include a system controller networked with the plurality of host servers and including a device processor and a non-transitory computer readable medium including instructions stored thereon and executable by the processor, wherein the computer readable medium of the system controller includes instructions for performing the following steps: receiving commands to host two or more virtual machines on the plurality of machines; making a determination as to which of the two or more virtual machines share commonalities with one another; and based on the determination, providing instructions to the plurality of machines to host virtual machines determined to share one or more commonalities with one another on the same machine.

In another aspect, the present disclosure is directed to a method of configuring a data processing system. The method may include receiving commands, with a system controller, to host two or more virtual machines on a plurality of machines networked in communication with one another, each machine including a device processor and a non-transitory computer readable medium including instructions stored thereon and executable by the processor. In addition, the method may include making a determination, with the system controller, as to which of the two or more virtual machines share commonalities with one another and, based on the determination, the system controller providing instructions to the plurality of machines to host virtual machines determined to share one or more commonalities with one another on the same machine.

In another aspect, the present disclosure is directed to a data processing system. The system may include a plurality of host servers, each host server including a device processor and a non-transitory computer readable medium including instructions stored thereon and executable by the processor, wherein the computer readable medium of each server includes instructions for running one or more virtual machines, and wherein the plurality of host servers are networked in communication with one another. The system may also include a system controller networked with the plurality of host servers and including a device processor and a non-transitory computer readable medium including instructions stored thereon and executable by the processor, wherein the computer readable media of the system controller includes instructions for performing the following steps: receiving commands to terminate a hosting session of one or more virtual machines hosted on the plurality of host servers; making a determination as to how much processing capacity is required of each of the plurality of host servers to host the remaining virtual machines following the termination of one or more virtual machines; and if hosting the remaining virtual machines requires less than a predetermined amount of processing capacity from one or more host servers of the plurality of host servers, moving all other processes from the one or more host servers to other host servers and changing the one or more host servers from which processes have been moved from an online mode in which the one or more host servers are fully powered up to an offline mode in which the one or more host servers utilize a reduced amount of electrical power.

In another aspect, the present disclosure is directed to a data processing system. The system may include a plurality of host servers, each host server including a device processor and a non-transitory computer readable medium including instructions stored thereon and executable by the processor, wherein the computer readable medium of each server includes instructions for running one or more virtual machines, and wherein the plurality of host servers are networked in communication with one another. The system may also include a system controller networked with the plurality of host servers and including a device processor and a non-transitory computer readable medium including instructions stored thereon and executable by the processor, wherein the computer readable media of the system controller includes instructions for performing the following steps: receiving commands to activate a hosting session of one or more virtual machines to be hosted on the plurality of host servers; making a determination as to how much processing capacity is required of each of the plurality of host servers to host the active virtual machines following the activation of the hosting session of the one or more virtual machines; and if hosting the active virtual machines requires more than a predetermined amount of processing capacity from one or more host servers of the plurality of host servers, powering up an additional host server from an offline mode in which the one or more host servers utilize a reduced amount of electrical power to an online mode in which the additional host server is fully powered up.

In another aspect, the present disclosure is directed to a method of operating a data processing system. The method may include receiving commands, with a system controller networked with a plurality of host servers, to terminate a hosting session of one or more virtual machines hosted on the plurality of host servers, each host server including a device processor and a non-transitory computer readable medium including instructions stored thereon and executable by the processor. The method may also include determining, with the system controller, as to how much processing capacity is required of each of the plurality of host servers to host the remaining virtual machines following the termination of one or more virtual machines and, if hosting the remaining virtual machines requires less than a predetermined amount of processing capacity from one or more host servers of the plurality of host servers, the system controller moving all other processes from the one or more host servers to other host servers and changing the one or more host servers from which processes have been moved from an online mode in which the one or more host servers are fully powered up to an offline mode in which the one or more host servers utilize a reduced amount of electrical power.

In another aspect, the present disclosure is directed to a method of operating a data processing system. The method may include receiving commands, with a system controller networked with a plurality of host servers, to activate a hosting session of one or more virtual machines to be hosted on the plurality of host servers, each host server including a device processor and a non-transitory computer readable medium including instructions stored thereon and executable by the processor. The method may also include determining, with the system controller, as to how much processing capacity is required of each of the plurality of host servers to host the virtual machines following the activation of the hosting session of the one or more virtual machines and, if hosting the virtual machines, including the virtual machine to be activated, requires more than a predetermined amount of processing capacity from one or more host servers of the plurality of host servers, the system controller powering up an additional host server from an offline mode in which the additional host server utilizes a reduced amount of electrical power to an online mode in which the additional host server is fully powered up.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to data processing systems. The disclosed systems may include features for configuring the system to improve efficiency, increase processing speed, improve security, and/or reduce heat production. In particular, the disclosed systems may include provisions for hosting applications and/or virtual machines on the same host server in order to provide one or more of the benefits noted above.

Grouping Apps on Servers Based on Communication

A data center may include two or more different servers that host applications that communicate with one another as a matter of standard operations. In some cases, two such servers may be separated from one another, physically and/or virtually. For example, in some cases, the servers may be located across the server room from one another. Physical separation typically means there are multiple connections, components, firewalls, etc. along the path of communication between the two servers. This limits the speed and efficiency with which communication between applications hosted on these separate servers can take place. In other cases, the servers may be located within relatively close physical proximity to one another, but virtually far apart, as multiple connections, components, firewalls, etc., may be disposed along the path of communication between the two servers even if the servers are located physically right next to one another. Such physical or virtual separation between servers hosting applications or virtual machines that communicate with one another may occur for any number of reasons. In some cases it may occur as data centers are updated to include new pieces of equipment and reconfigured to add services and functionality. Instead of overhauling the entire processing configuration of the data center, the new equipment and services are added in a piecemeal fashion or on an ad hoc basis. This can lead to inefficient configurations in which applications or virtual machines that communicate with one another are hosted on servers that are separated from one another physically or virtually.

In order to improve communication between two applications or virtual machines that regularly communicate with one another, the disclosed system may include provisions to configure itself to host the two applications or virtual machines on the same host server if the two applications or virtual machines are determined to communicate with one another.

Figure 1:
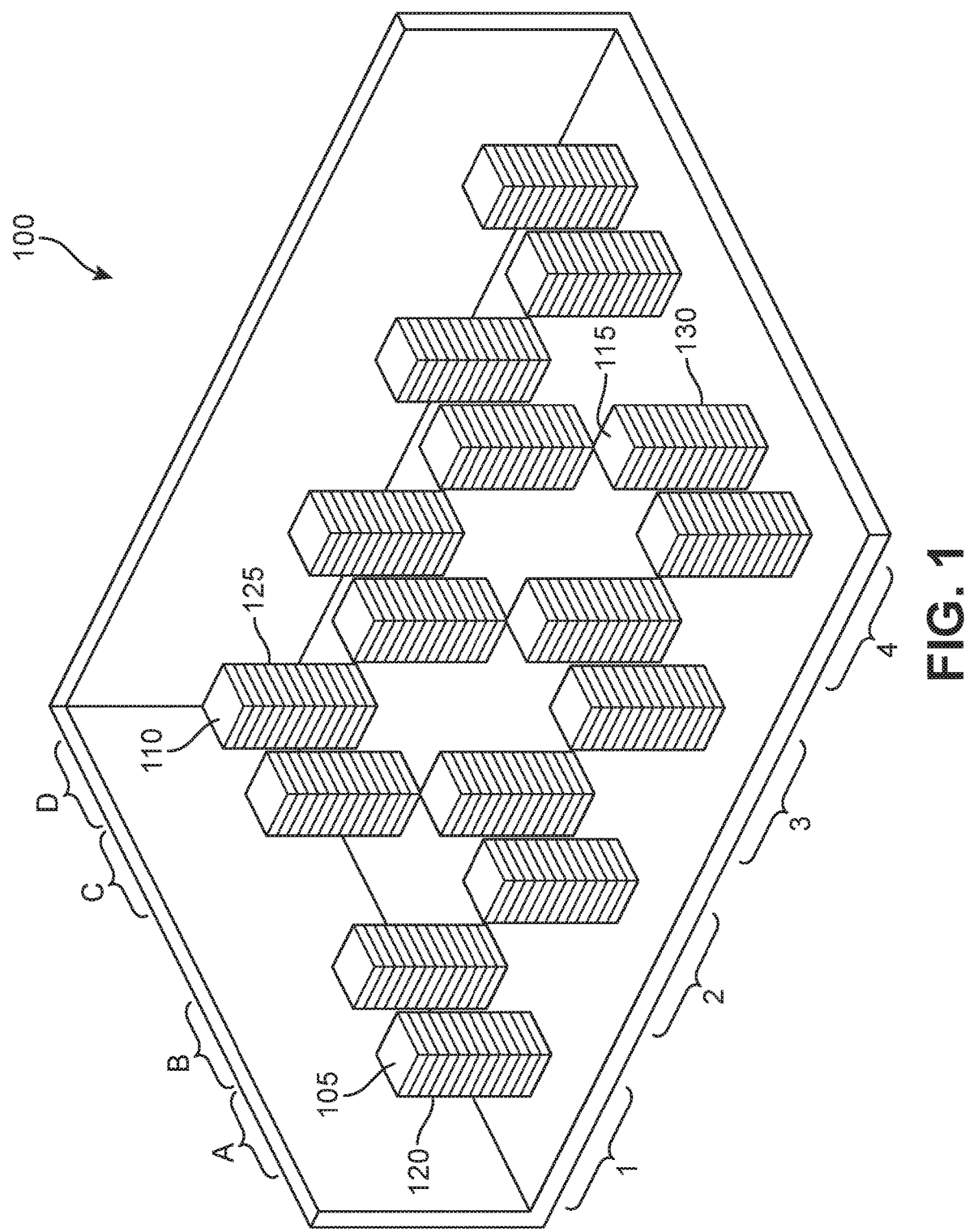
FIG. 1 is a schematic top perspective view of an electronic equipment room with two walls and the ceiling removed for purposes of illustration.

FIG. 1 is a schematic top perspective view of an electronic equipment room (e.g., a server room 100) with two walls and the ceiling removed for purposes of illustration. The equipment shown in FIG. 1 is intended to be generic. The pillars in FIG. 1 represent stacks of electronic equipment components, such as computer servers. Other types of equipment may also be disposed in room 100, such as audio-visual equipment, electrical power distribution equipment, various types of computing equipment, and any other electrical equipment. Such an electronic equipment room may be found at a variety of locations, such as data centers for handling internet traffic, computing centers for handling computing processes of businesses or educational institutions, and other heavily electronic establishments, such as amusement parks, theaters, performing arts centers, etc.

FIG. 1 shows a plurality of server stacks in server room 100. In some cases, the server stacks may be arranged in a grid, as shown in FIG. 1. For example, FIG. 1 shows a grid of server stacks arranged in four rows and four columns. Specifically, as shown in FIG. 1, the server stacks may be arranged in a first row A, a second row B, a third row C, and a fourth row D. As also shown in FIG. 1, the server stacks may be disposed in a first column 1, a second column 2, a third column 3, and a fourth column 4. Accordingly, the location of a given server stack can be identified using two-character grid nomenclature or coordinates. For example, the locations of server stacks may be identified as A1, C3, D4, etc. In FIG. 1, a first server stack 105 is shown at grid position A1. In addition, a second server stack is shown at grid position D1 and a third server stack 115 is shown at grid position B4. This simple grid arrangement is utilized for its simplicity for purposes of explanation of the concepts disclosed herein. It will be understood that that the number of server stacks as well as the arrangement may vary, and that the concepts discussed herein apply to a variety of different arrangements.

In some embodiments, each stack of servers may function together in a so-called server "cluster." In some embodiments, a server cluster may include multiple stacks of servers. Further, in some embodiments, servers from more than one stack may function together as a cluster. For example, a cluster may include all servers from a first stack, and only some of the servers in a second stack. It will be understood that the clustering of servers may be configured in various ways, with cluster servers controlling the collective function of the collection of servers in each cluster, regardless of which physical stack the servers are disposed in.

As shown in FIG. 1, first server stack 105 may include a first server 120 within the stack. Also, second server stack 110 may include a second server 125 in the stack. Further, third server stack 115 may include a third server 130 in the stack. In some embodiments, applications and/or virtual machines may be running on first server 120 that communicate with applications and/or virtual machines on second server 125. However, because first server 120 and second server 125 are located in different stacks.

Clustered or otherwise, multiple servers, particularly servers housed in the same facility, are controlled collectively. In order to effectuate such control, a system controller may be provided in the system. The system controller may come in various forms. For example, the system controller may include one or more components, such as a provisioning services server (PVS), cluster server, vCenter server (i.e., a virtual machine control component), etc. In some embodiments, one of these devices may serve as the system controller having various functions described below. In other embodiments, the system controller may include more than one of these devices. For example, in some cases, the system controller may include both a vCenter server and a provisioning services server. In some embodiments, the system controller may include a top rack switch, which is provided at the top of each server stack and controls certain operations of the servers in the stack. In other embodiments, the system controller may be provided within one or more of the host servers in the system. In some cases, the functions below may be stored on computer readable media of the host servers themselves, and controlled by the processors therein as well. Accordingly, when using the term "system controller" herein, the present disclosure refers to any of the system controller configurations discussed above. In any of these configurations, the system controller has at least two components, namely a device processor and a computer readable medium including instructions stored thereon that are executable by the processor.

Figure 2:
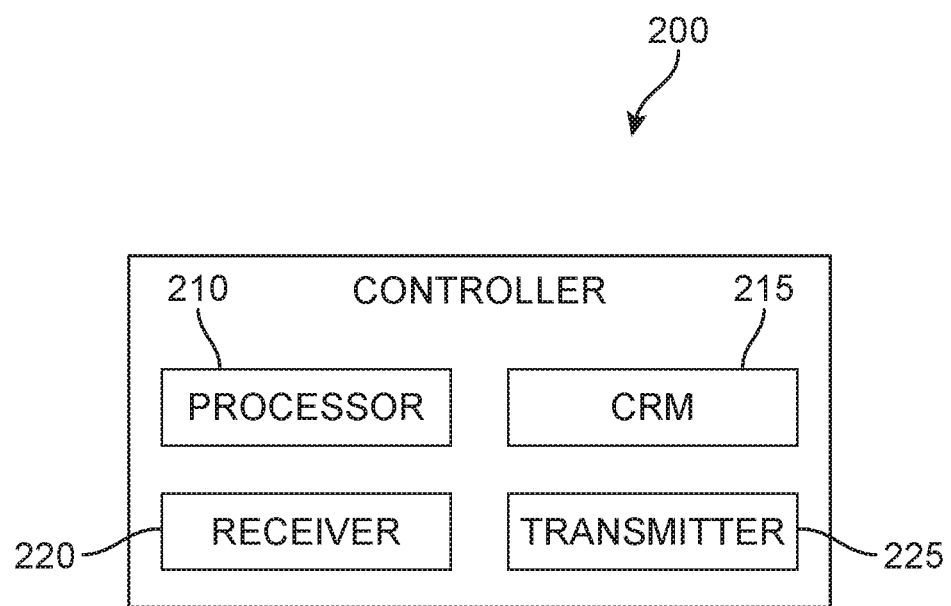
FIG. 2 is a schematic block diagram illustration of a system controller.

FIG. 2 is a schematic block diagram illustration of a system controller 200. Controller 200 may include various computing and communications hardware, such as servers, integrated circuits, displays, etc. Further, controller 200 may include a device processor 210 and a non-transitory computer readable medium 215 including instructions executable by device processor 210 to perform the processes discussed herein.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 200 may include networking hardware configured to interface with other nodes of a network, such as a LAN, WLAN, or other networks. In Further, controller 200 may be configured to receive data from a plurality of sources and communicate information to one or more external destinations. Accordingly, controller 200 may include a receiver 220 and a transmitter 225. (It will be appreciated that, in some embodiments, the receiver and transmitter may be combined in a transceiver.) In some cases, communications between components may be made via the Internet, a cellular network, WIFI, or other suitable communications network.

Any suitable communication platforms and/or protocols may be utilized for communication between controller 200 and other components of the system. Since the various sources of information may each have their own platform and/or protocol, the system may be configured to interface with each platform and/or protocol to receive the data.

In some embodiments, the disclosed data processing system may include a plurality of host servers networked in communication with one another, each host server including a device processor and a non-transitory computer readable medium including instructions stored thereon and executable by the processor. The computer readable medium of each server may include instructions for running one or more application. In some embodiments, the system may include machines other than host servers. For example, the system may include a plurality of networked personal computers (e.g., desktop computers, laptops, tablets, etc.) or other personal electronic devices (e.g., smart phones, smart watches, etc.) configured to run one or more applications.

Figure 3:
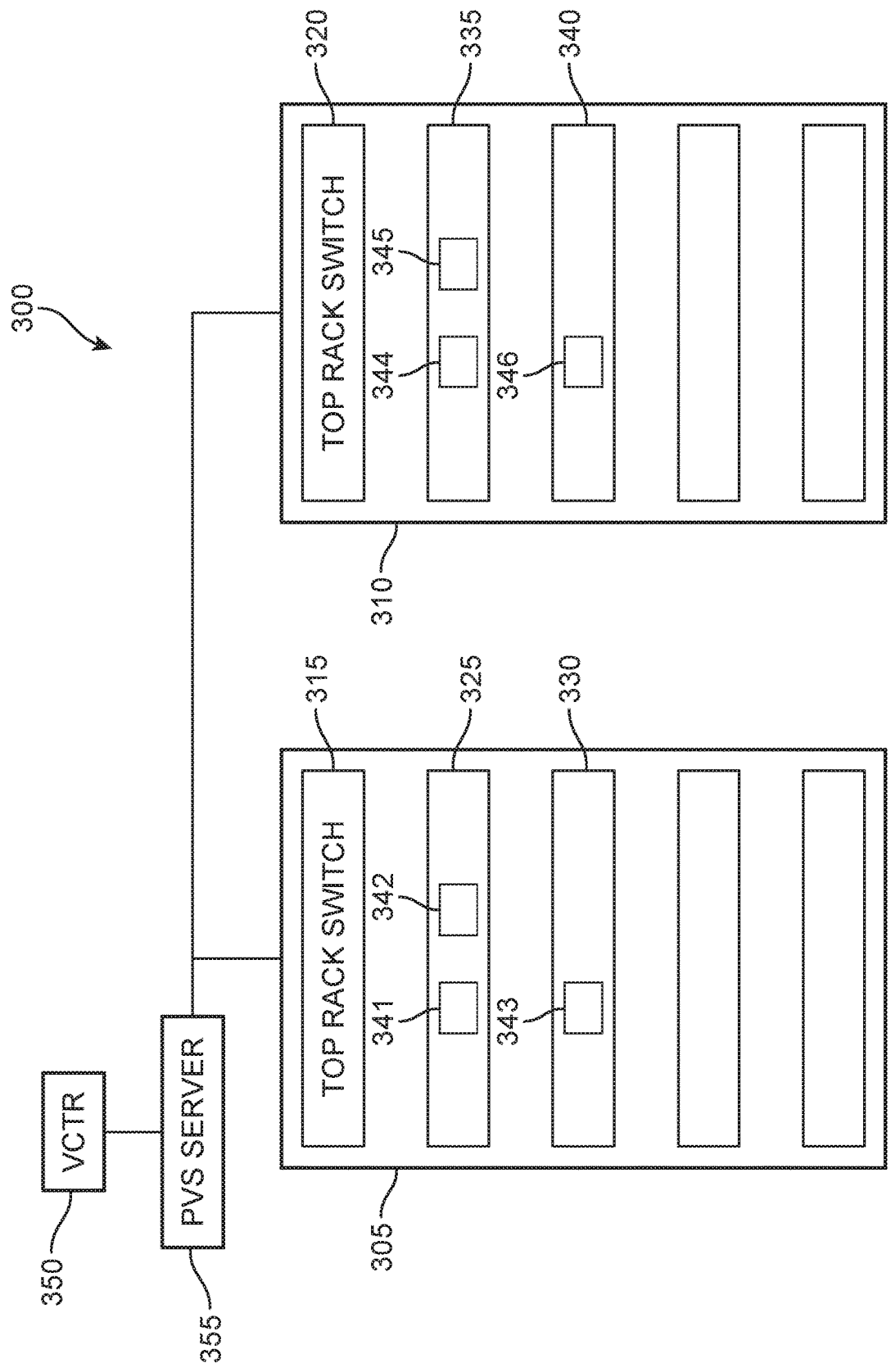
FIG. 3 is a schematic block diagram illustration of a data processing system illustrating a configuration feature.

FIG. 3 is a schematic block diagram illustration of a data processing system 300. As shown in FIG. 3, a data processing system 300 may include a plurality of host servers (or machines). For example, system 300 may include a first server stack 305 and a second server stack 310. In some embodiments, each stack may include equipment configured to regulate the operation of its respective stack. For example, as shown in FIG. 3, first server stack 305 may include a first top rack switch 315 configured to control operation of the servers in first server stack 305. Second server stack 310 may include a second top rack switch 320 configured to control operation of the servers in second server stack 310.

As shown in FIG. 3, first server stack 305 may include a plurality of host servers, including for example, a first host server 325 and a second host server 330. Similarly, second server stack 315 may include a third host server 335 and a fourth host server 340.

While only two host servers from each stack will be discussed herein, it will be understood that each server stack may include more than two host servers. Further, the disclosed concept may be applicable across more than two server stacks. In some embodiments, the plurality of host servers described above are all disposed at the same facility. In some such embodiments, the plurality of host servers may all be disposed in the same room. In other such embodiments, two or more of the plurality of host servers may be disposed in different rooms of the facility from one another. In other embodiments, two or more of the plurality of host servers may be disposed at different facilities from one another.

Each of these host servers may include a device processor and a non-transitory computer readable medium including instructions stored thereon and executable by the processor. The computer readable medium of each server includes instructions for running one or more applications. For example, as shown in FIG. 3, the computer readable medium of first host server 325 may include instructions for running a first application 340 and a second application 342. Also, the computer readable medium of second host server 330 may include instructions for running a third application 343. Further, the computer readable medium of third host server 335 may include instructions for running a fourth application 344 and a fifth application 345. In addition, fourth host server may include instructions for running a sixth application 346. The type and nature of these applications may vary. In some embodiments, one or more of these applications may be virtual machines. In other embodiments, one or more of these applications may be an email application, database application, or other suitable applications.

The plurality of host servers discussed above may be networked in communication with one another. For example, system 300 may include a system controller networked with the plurality of host servers and including a device processor and a non-transitory computer readable medium including instructions stored thereon and executable by the processor. As discussed above, the system controller may include a vCenter server 350 and/or a provisioning services server (PVS) 355. One or both of these servers may include a computer readable medium with instructions for controlling operations of the host servers in the network. For example, the computer readable medium may include instructions for receiving commands to run two or more applications on the plurality of host servers.

The computer readable medium of the system controller may further include instructions for making a determination as to which of the two or more applications communicate with one another during operation. Further, the computer readable medium may include instructions for, based on the determination, providing instructions to the plurality of host servers to run running applications determined to communicate with one another on the same host server.

Figure 4:
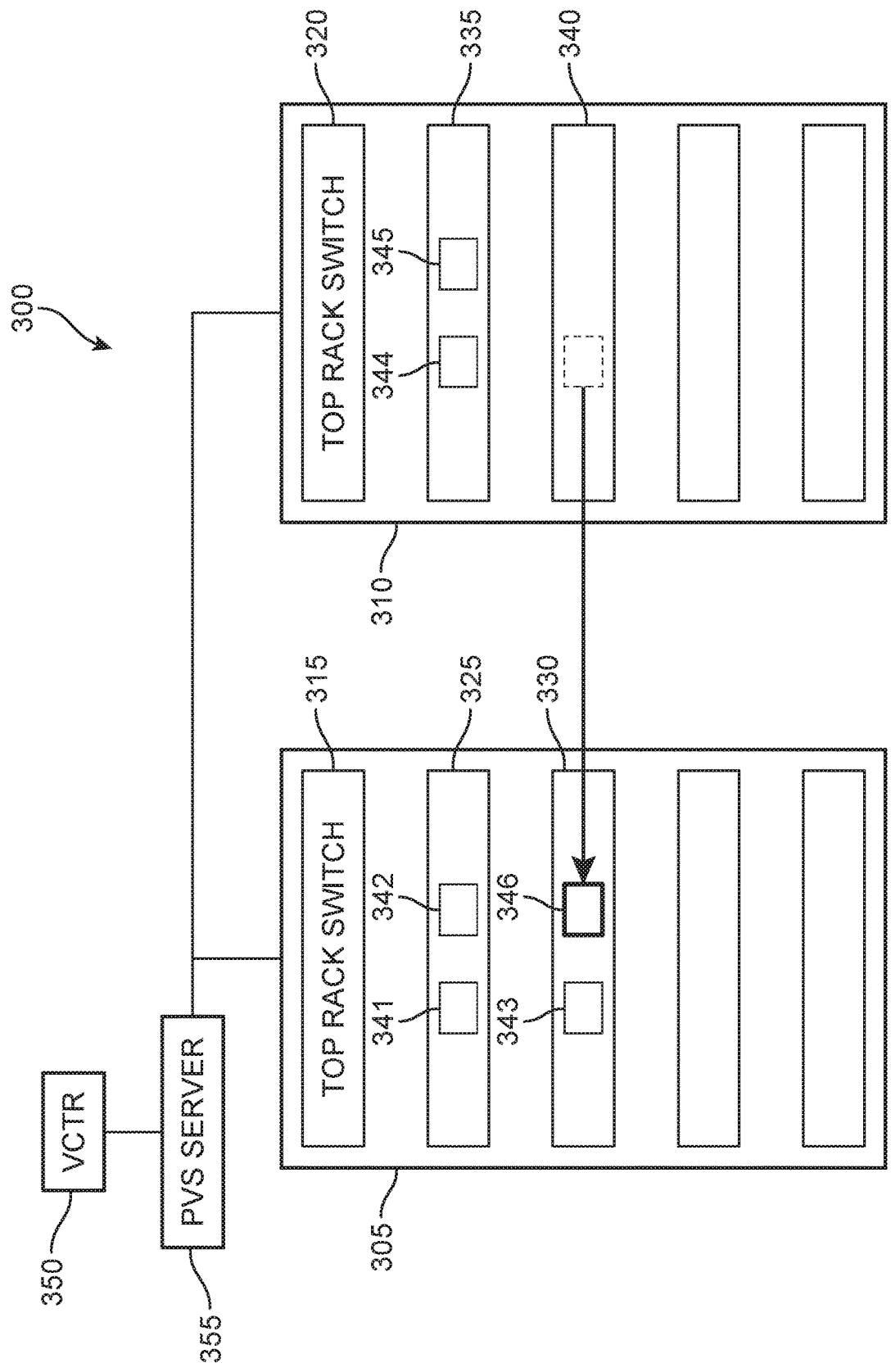
FIG. 4 is a schematic block diagram illustration of the data processing system of FIG. 3 with an application moved from a host server in one server stack and grouped with other applications with which it communicates in another host server in a second server stack.

FIG. 4 is a schematic block diagram illustration of the data processing system 300 of FIG. 3 with an application moved from a host server in one server stack and grouped with other applications with which it communicates in another host server in a second server stack. In particular, system 300 may be configured to determine whether third application 343 and sixth application 346 communicate with one another. If they do, the system may relocate sixth application 346 to be hosted on second host server 330 along with third application 343, as shown in FIG. 4.

System 300 may be configured to execute the migration of sixth application 346 to second host server 330, or simply provide recommendations for how to configure hardware and virtual modules for efficiency based on the assessment of which apps are communicating with each other. This optimization (or recommended optimization) may be facilitated at one or more of three different stages, namely at application development, at application deployment/installation, and/or post-installation of the applications.

For example, in some cases, the optimization may be coordinated at the stage of application development. Since the application developer will know the other applications with which the given application will communicate, they can build in recommendations or procedures to be executed in order to group communicating applications with one another on the same host server. Accordingly, the determination as to which applications communicate with one another may be performed based on a listing, stored on one or more of the two or more applications, of other applications with which each application communicates during operation. This may be applicable at deployment, for example, during installation of the applications, and/or as part of ongoing operation of fully installed applications.

In some cases, data may be collected post-installation as to the applications with which the given application communicates. Accordingly, in some embodiments, the determination as to which applications communicate with one another is performed based on data, collected during operation of the two or more applications, regarding which other applications each application communicates.

Figure 5:
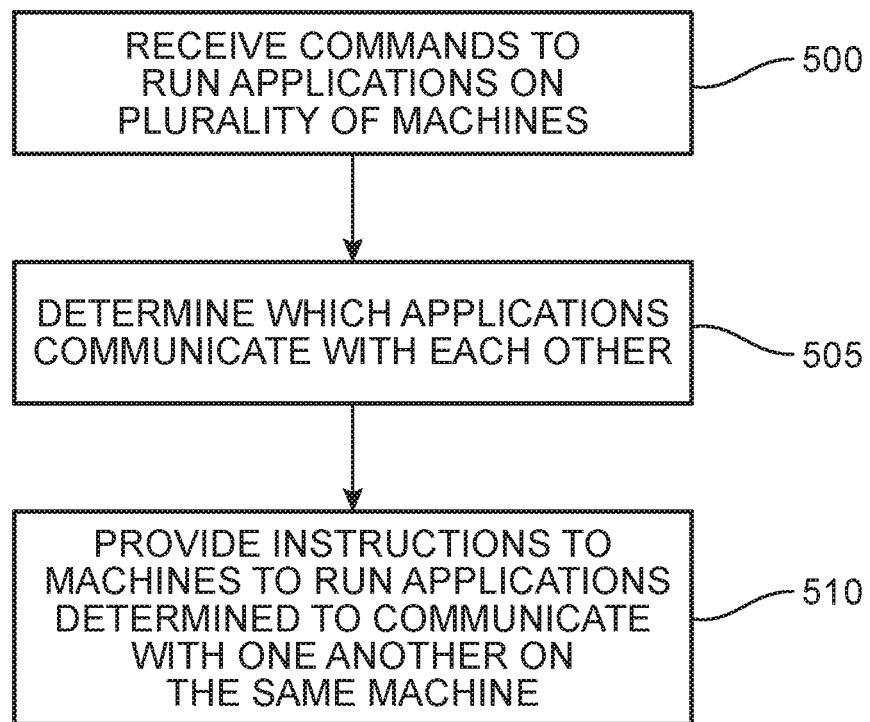
FIG. 5 is a flowchart illustrating a process of a method of configuring the data processing system shown in FIGS. 3 and 4.

FIG. 5 is a flowchart illustrating a process of a method of configuring the data processing system shown in FIGS. 3 and 4. As shown in FIG. 5, the method may include receiving commands, with a system controller networked with a plurality of machines, to run two or more applications on a plurality of machines networked in communication with one another, each machine including a device processor and a non-transitory computer readable medium including instructions stored thereon and executable by the processor. (Step 500.) In addition, the method may include determining, with the system controller, which of the two or more applications communicate with one another during operation. (Step 505.) Further, the method may include the system controller providing instructions to the plurality of machines to run applications determined to communicate with one another on the same machine. (Step 510.)

In addition, as discussed above, in some embodiments, the step of determining of which applications communicate with one another may be performed based on a listing, stored on one or more of the two or more applications, of other applications with which each application communicates during operation. Alternatively, or additionally, as also discussed above, the step of determining which applications communicate with one another may be performed based on data collected during operation of the two or more applications regarding which other applications each application communicates.

It will be understood that these method steps are performed by a device processor in one or more of the physical system components discussed above by execution of instructions stored on a non-transitory computer readable medium of one or more of the physical system components discussed above.

Collecting VM's on Servers Based on Commonalities

For similar reasons to those discussed above, applications or virtual machines that have commonalities may end up hosted on servers that are separated from one another physically and/or virtually. For example, in some cases, a data center may be configured to host multiple staff virtual machines for the same organization. Some of these staff virtual machines may be hosted on different servers. Further, in some cases, the same data center may also host one or more virtual machines that are used for regular communication with outside clients and/or multiple users. For example, the Payment Card Industry (PCI) utilizes equipment, such as Automated Teller Machines (ATM), that is networked. Accordingly, the processing for each ATM may run as a virtual machine hosted at a data center. In some cases ATM virtual machines may be run on the same host server as staff virtual machines. However, because the PCI virtual machines involve interaction from multiple users, and because the PCI virtual machine handles the transfer of sensitive data (e.g., financial data), the processing, communication, and security considerations for PCI virtual machines are significantly different compared to staff machines.

In order to address these considerations, the disclosed system may be configured to host applications/virtual machines on the same host server if the applications/virtual machines share commonalities with one another. For example, the system may be configured to run all staff virtual machines for a given organization on the same host server or servers and run all PCI virtual machines on one or more host servers that are separate from the server(s) hosting the staff virtual machines.

Figure 6:
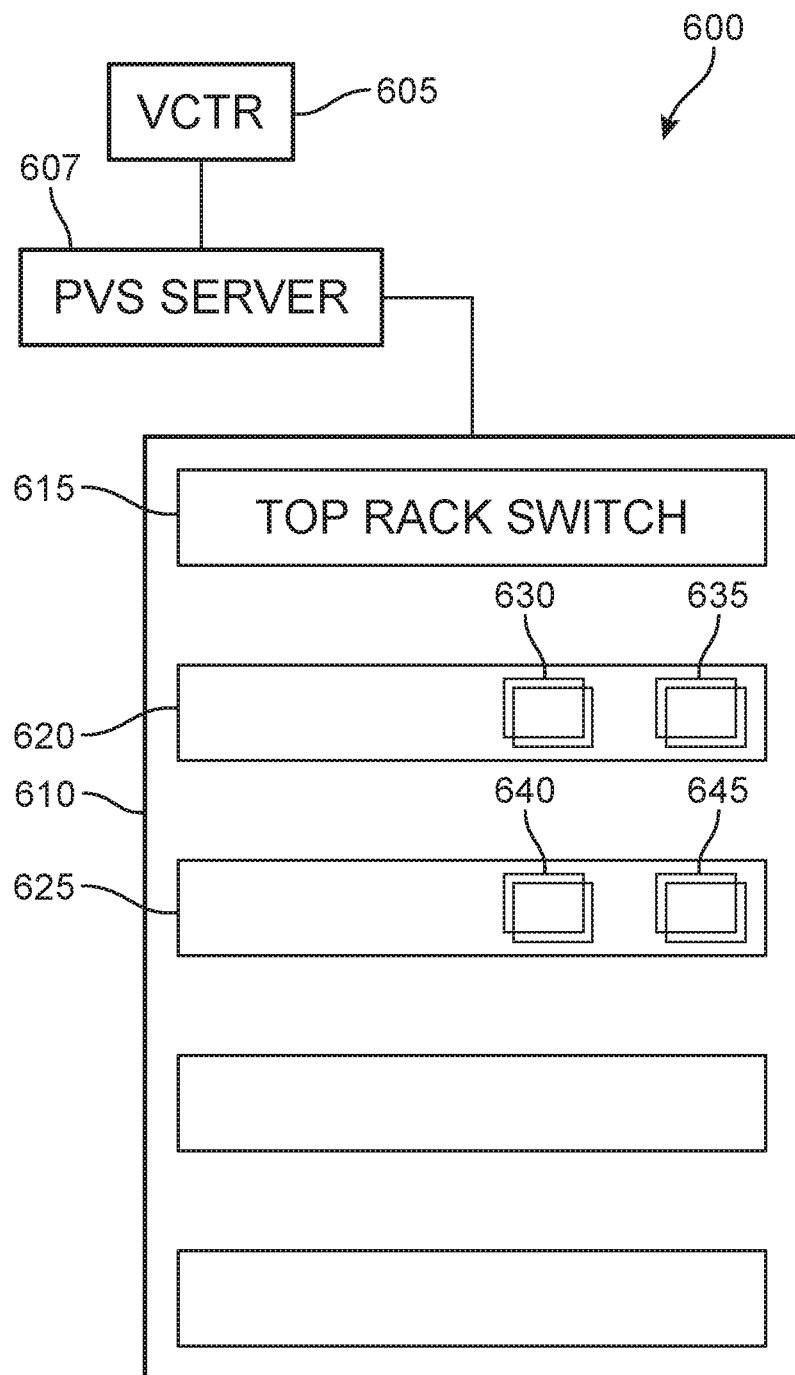
FIG. 6 is a schematic block diagram illustration of a data processing system illustrating another configuration feature.

FIG. 6 is a schematic block diagram illustration of a data processing system illustrating another configuration feature. As shown in FIG. 6, system 600 may include a system controller, which may include a vCenter server 605 and/or a provisioning services server 607. This system controller may be configured to control a plurality of host servers in a server stack 610 and networked in communication with one another, each server including a device processor and a non-transitory computer readable medium including instructions stored thereon and executable by the processor. As shown in FIG. 6, the plurality of servers may be disposed in the same server stack. However, it will be understood that the disclosed configuration feature may be applicable across host servers disposed remotely from one another. Accordingly, in some embodiments, the plurality of host servers may be all disposed at the same facility, in the same room, and possibly in the same stack. In other embodiments, the host servers may be disposed in separate facilities, for example, when the network covers more than one physical building location. Further involved in controlling the processing of the plurality of servers may be a top rack switch 615.

As shown in FIG. 6, server stack 610 may include at least a first host server 620 and a second host server 625. The computer readable medium of each server includes instructions for running one or more virtual machines. Further, the system controller may be networked with the plurality of host servers and may include a device processor and a non-transitory computer readable medium including instructions stored thereon and executable by the processor, wherein the computer readable medium of the system controller includes instructions for receiving commands to host two or more virtual machines on the plurality of host servers. As shown in FIG. 6, first host server 620 may be configured to host a first virtual machine 630 and a second virtual machine 635. Similarly, second host server 625 may be configured to host a third virtual machine 640 and a fourth virtual machine 645.

In some embodiments, the system controller may include instructions for making a determination as to which of the two or more virtual machines share commonalities with one another and, based on the determination, providing instructions to the plurality of host servers to host virtual machines determined to share one or more commonalities with one another on the same host server.

Figure 7:
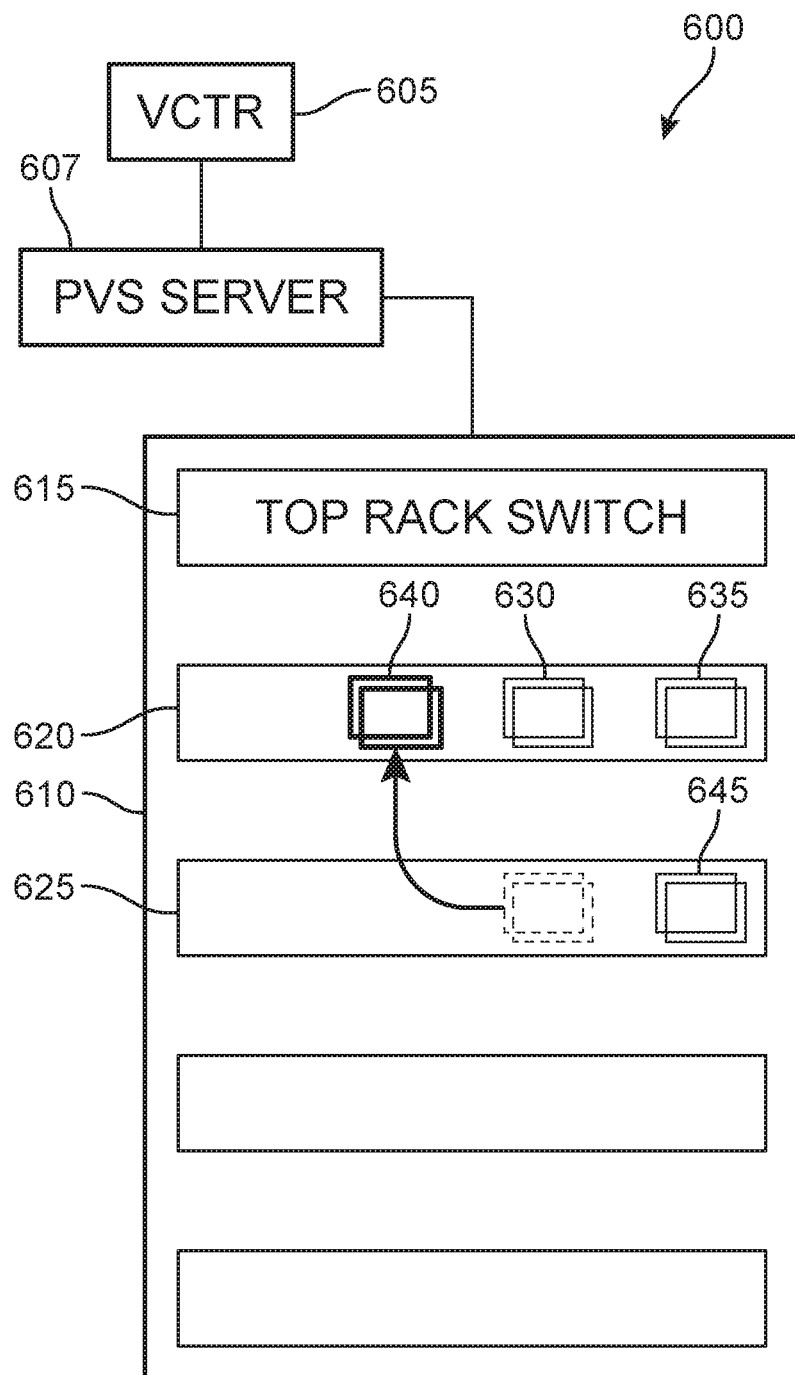
FIG. 7 is a schematic block diagram illustration of the system of FIG. 6 with a virtual machine moved from one host server to another host server and grouped with other virtual machines with which it has one or more commonalities.

FIG. 7 is a schematic block diagram illustration of the system of FIG. 6 with a virtual machine moved from one host server to another host server and grouped with other virtual machines with which it has one or more commonalities. In particular, third virtual machine 640, which was originally hosted on second host server 625 in FIG. 6, is shown in FIG. 7 as having been moved to be hosted on first host server 620. Such a change in configuration of system 600 may be prompted by commonalities between third virtual machine 640 and one or both of first virtual machine 630 and second virtual machine 635. For example, if first virtual machine 630, second virtual machine 635, and third virtual machine 640 are staff virtual machines for the same organization, and fourth virtual machine 645 is a PCI virtual machine (e.g., a virtual machine corresponding with an ATM machine), then communication, processing, and security considerations that are common among virtual machine 630, second virtual machine 635, and third virtual machine 640 may be different from those of fourth virtual machine. Accordingly, system 600 may be configured to group virtual machine 630, second virtual machine 635, and third virtual machine 640 together on the same host server, and keep fourth virtual machine 645 on a separate host server, as shown in FIG. 7.

In addition, system 600 may include provisions to not only group similar virtual machines together on the same host server, but also prevent different virtual machines from being hosted on the same host server. Accordingly, the computer readable medium of the system controller may further include instructions for making a determination as to whether the two or more virtual machines have one or more predetermined differences and preventing virtual machines having one or more predetermined differences from running on the same host server.

The predetermined differences may be of any nature that affects processing. For example, in some embodiments, the predetermined differences may include different levels of public interaction. For instance, virtual machines that are accessible by many users (e.g., PCI virtual machines associated with an ATM) have a significantly different level of public interaction as compared to virtual machines accessed by a single user. Another example of a predetermined difference upon which grouping of virtual machines may be performed may be different levels of security restrictions. A virtual machine configured for access by a secretarial staff manager may have minimal security restrictions, whereas a virtual machine configured for access by personnel working on a classified government contract may have a relatively high level of security associated with it. Similarly, another exemplary predetermined difference may be different levels of sensitivity with respect to data processed by the virtual machines. Examples of highly sensitive data may include financial data and medical records data.

As discussed above, optimization based on inter-application communication may be facilitated at one or more of three different stages, namely at application development, at application deployment/installation, and/or post-installation of the applications. Similarly, optimization based on commonalities between virtual machines may also be facilitated at these three stages. Accordingly, the determination as to which virtual machines share commonalities with one another may be performed based on a listing, stored on one or more of the two or more virtual machines (e.g., at the stage of application development or deployment), of other virtual machines with which each virtual machine shares commonalities. Alternatively, or additionally, the determination as to which virtual machines share commonalities with one another is performed based on data collected during operation of the two or more virtual machines (i.e., post-deployment) regarding which other virtual machines each virtual machine communicates.

Figure 8:
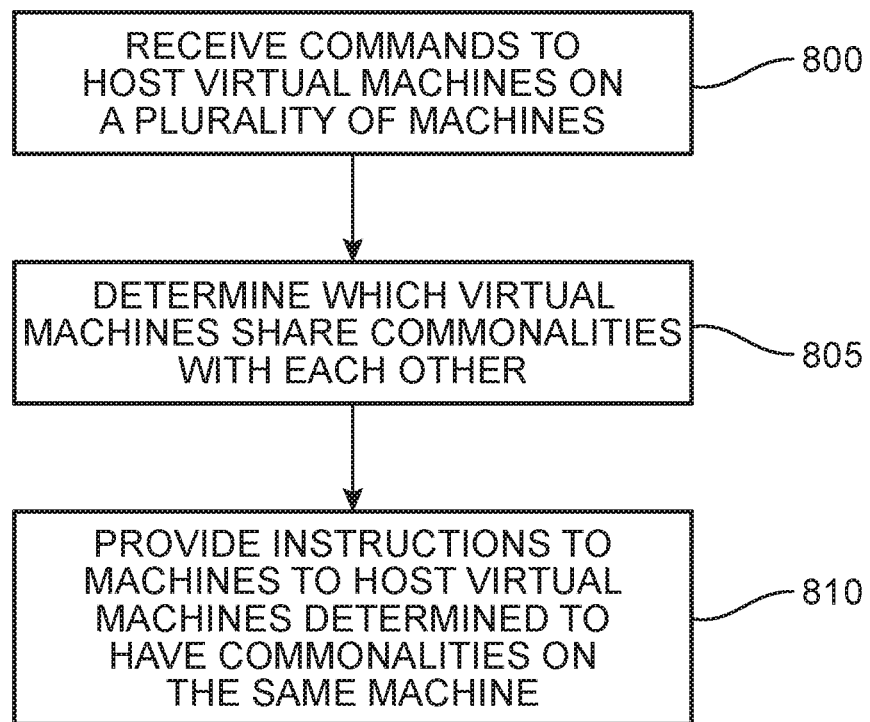
FIG. 8 is a flowchart illustrating a process of configuring the data processing system shown in FIGS. 6 and 7.

FIG. 8 is a flowchart illustrating a method of configuring the data processing system shown in FIGS. 6 and 7. As shown in FIG. 8, the method may include receiving commands, with a system controller, to host two or more virtual machines on a plurality of machines networked in communication with one another, each machine including a device processor and a non-transitory computer readable medium including instructions stored thereon and executable by the processor. (Step 800.) In addition, the method may include making a determination, with the system controller, as to which of the two or more virtual machines share commonalities with one another (step 805) and, based on the determination, the system controller providing instructions to the plurality of machines to host virtual machines determined to share one or more commonalities with one another on the same machine (step 810).

In addition, the method may include making a determination as to whether the two or more virtual machines have one or more predetermined differences and preventing virtual machines having one or more predetermined differences from running on the same host server. The predetermined differences may be selected from the group including different levels of public interaction, different levels of security restrictions, and different levels of sensitivity with respect to data processed by the virtual machines. The data having different levels of sensitivity may include highly sensitive data and less sensitive data. In some embodiments, the highly sensitive data may include at least one of financial data and medical records data.

As discussed above, the step of determining which virtual machines share commonalities with one another may be performed based on a listing, stored on one or more of the two or more virtual machines, of other virtual machines with which each virtual machine shares commonalities. Alternatively, or additionally, the step of determining which virtual machines share commonalities with one another may be performed based on data collected during operation of the two or more virtual machines regarding which other virtual machines each virtual machine communicates.

Virtual Desktop Infrastructure (VDI) Management

Typical data centers are configured to spread out data processing across all available servers in order to minimize the load on any given server. However, during periods of low usage, evenly spreading data processing across all servers leaves each server running at such a low capacity that keeping all servers running is particularly inefficient from both energy usage and data processing standpoints.

Accordingly, in order to address this issue, in some embodiments, the disclosed system may be configured to consolidate applications/virtual machines on the same host server(s) and placing unused servers in an offline mode requiring a reduced amount of electrical power in order to conserve energy. The offline mode may be any condition in which the server requires a reduced amount of power. In some cases, in the offline mode the server may be completely off (i.e., fully powered down). In some cases, in the offline mode the server may be in a standby or maintenance mode in which the server requires only a minimal amount of power. The server may be powered up to a fully online mode from a standby or maintenance mode much more quickly than it can be powered up from being fully powered down (i.e., off). Accordingly, when additional virtual machines are requested, host servers may be brought online very quickly in order to host the additional virtual machines if the host servers that are currently online are already operating at a predetermined processing capacity. For example, if hosting the additional requested virtual machine will require greater than 90% of the processing capacity of each of the currently online host servers, another host server may be brought online to accommodate the additional processing.

In some embodiments, the computer readable medium of the system controller may include instructions for substantially evenly distributing processes to all host servers that are in the online mode. Accordingly, although the disclosed system may be configured to (unconventionally) consolidate virtual machines onto less than all of the available servers and power down unused servers, once the number of online servers has been reduced, the system may evenly distribute processing among the online servers.

An example to illustrate the difference from a conventional system is as follows. Utilizing round numbers for purposes of explanation, an exemplary system may include 10 host servers, each capable of handling 10 processing tasks at a time, for a total capacity of 100 processing tasks. If a total of 50 processing tasks are required to be run at a given time, a conventional system would operate all 10 servers at 50% processing capacity (i.e., using 5/10ths capacity for each server). In contrast, the system disclosed herein may consolidate the 50 processing tasks onto only 6 servers, all running at approximately 83% capacity, and power down 4 of the 10 servers. That is, the 6 online servers would have the capacity to run 60 processing tasks total, but only 50 total processing tasks are required at the time in question. Spreading these 50 processing tasks across the 6 online servers results in each online server running approximately 8.3 tasks on average. Accordingly, 8.3 tasks is 83% of the 10 processing tasks that each hypothetical server is capable of executing.

In reality, the individual processing tasks may not be able to be split up. For example, considering a virtual machine as a processing task, each virtual machine must be hosted completely on a single host server. Accordingly, the online servers may host uneven numbers of virtual machines. For example, if the hypothetical 50 processing tasks are 50 virtual machines, the 6 online servers may include 4 servers each hosting 8 virtual machines, and 2 servers each hosting 9 virtual machines. That is, 8+8+8+8+9+9=50. This represents the most even distribution of processing achievable while minimizing the number of host servers being used and without overburdening any of the host servers. Accordingly, the disclosed system may be configured to optimize hosting of virtual machines in a similar manner.

Figure 9:
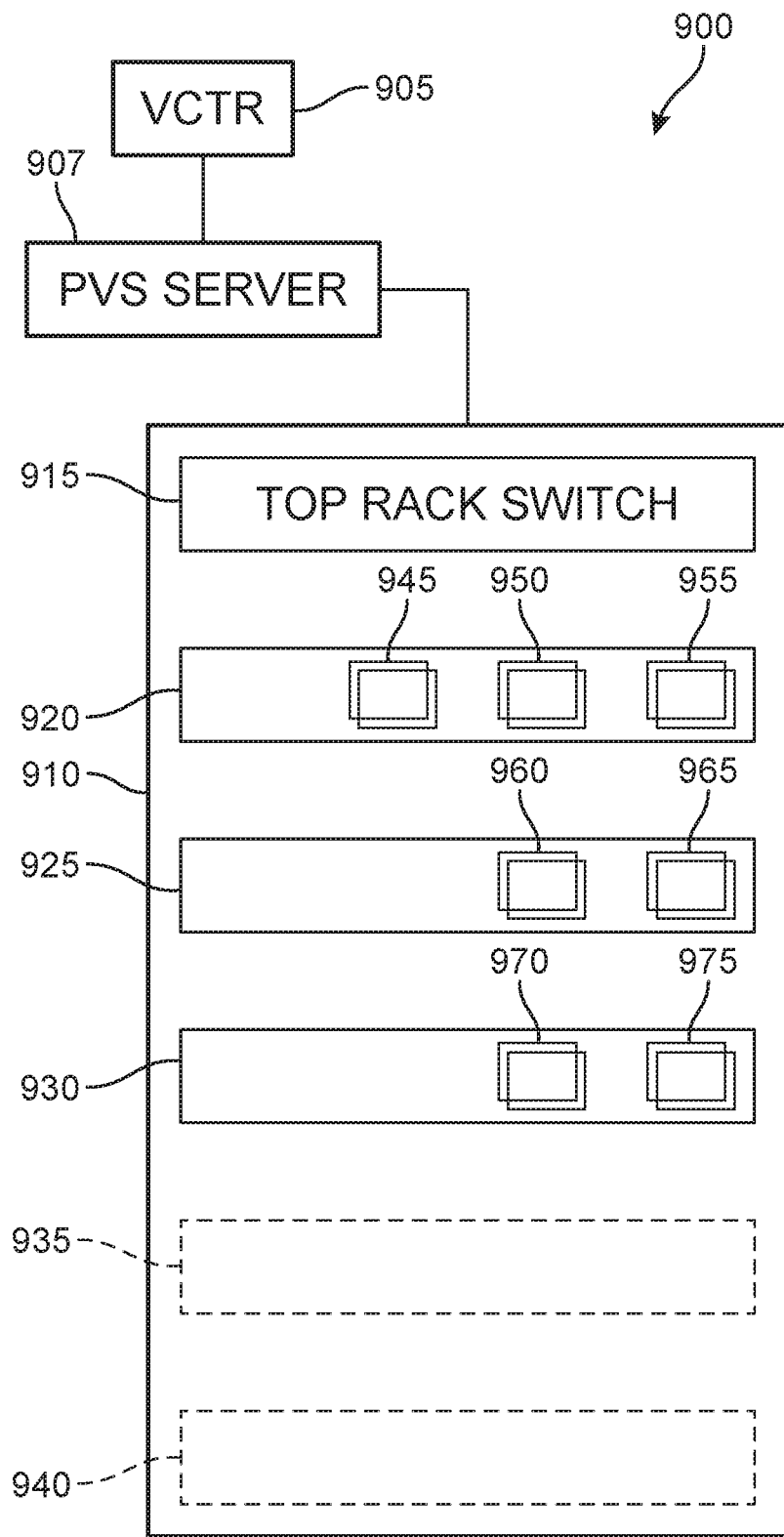
FIG. 9 is a schematic block diagram illustration of a data processing system illustrating another configuration feature.

FIG. 9 is a schematic block diagram illustration of a data processing system illustrating another configuration feature. As shown in FIG. 9, system 900 may include a system controller, which may include a vCenter server 905 and/or a provisioning services server 907. This system controller may be configured to control a plurality of host servers in a server stack 910 and networked in communication with one another, each server including a device processor and a non-transitory computer readable medium including instructions stored thereon and executable by the processor. As shown in FIG. 9, the plurality of servers may be disposed in the same server stack. However, it will be understood that the disclosed configuration feature may be applicable across host servers disposed remotely from one another. Accordingly, in some embodiments, the plurality of host servers may be all disposed at the same facility, in the same room, and possibly in the same stack. In other embodiments, the host servers may be disposed in separate facilities, for example, when the network covers more than one physical building location. Further involved in controlling the processing of the plurality of servers may be a top rack switch 915.

As shown in FIG. 9, server stack 910 may include at least a first host server 920, a second host server 925, a third host server 930, a fourth host server 935, and a fifth host server 940. The computer readable medium of each server may include instructions for running one or more virtual machines. Further, the system controller may be networked with the plurality of host servers and may include a device processor and a non-transitory computer readable medium including instructions stored thereon and executable by the processor. In particular, the computer readable medium of the system controller may include instructions for receiving commands to host two or more virtual machines on the plurality of host servers. As shown in FIG. 9, first host server 920 is shown hosting a first virtual machine 945, a second virtual machine 950, and a third virtual machine 955. Similarly, second host server 925 is shown hosting a fourth virtual machine 960 and a fifth virtual machine 965. Further, third host server 930 is shown hosting a sixth virtual machine 970 and a seventh virtual machine 975. Fourth host server 935 and fifth host server 940 are shown without any virtual machines being hosted. Further, fourth host server 935 and fifth host server 940 are shown with dashed outlines, indicating that these servers are currently in an offline mode (i.e., either completely off or in a low-power standby mode).

In some embodiments, the computer readable media of the system controller includes instructions for receiving commands to terminate a hosting session of one or more virtual machines hosted on the plurality of host servers. Further, the computer readable media of the system controller may include instructions for making a determination as to how much processing capacity is required of each of the plurality of host servers to host the remaining virtual machines following the termination of one or more virtual machines and, if hosting the remaining virtual machines requires less than a predetermined amount of processing capacity from one or more host servers of the plurality of host servers, moving all other processes from the one or more host servers to other host servers and changing the one or more host servers from which processes have been moved from an online mode in which the one or more host servers are fully powered up to an offline mode in which the one or more host servers utilize a reduced amount of electrical power.

Figure 10:
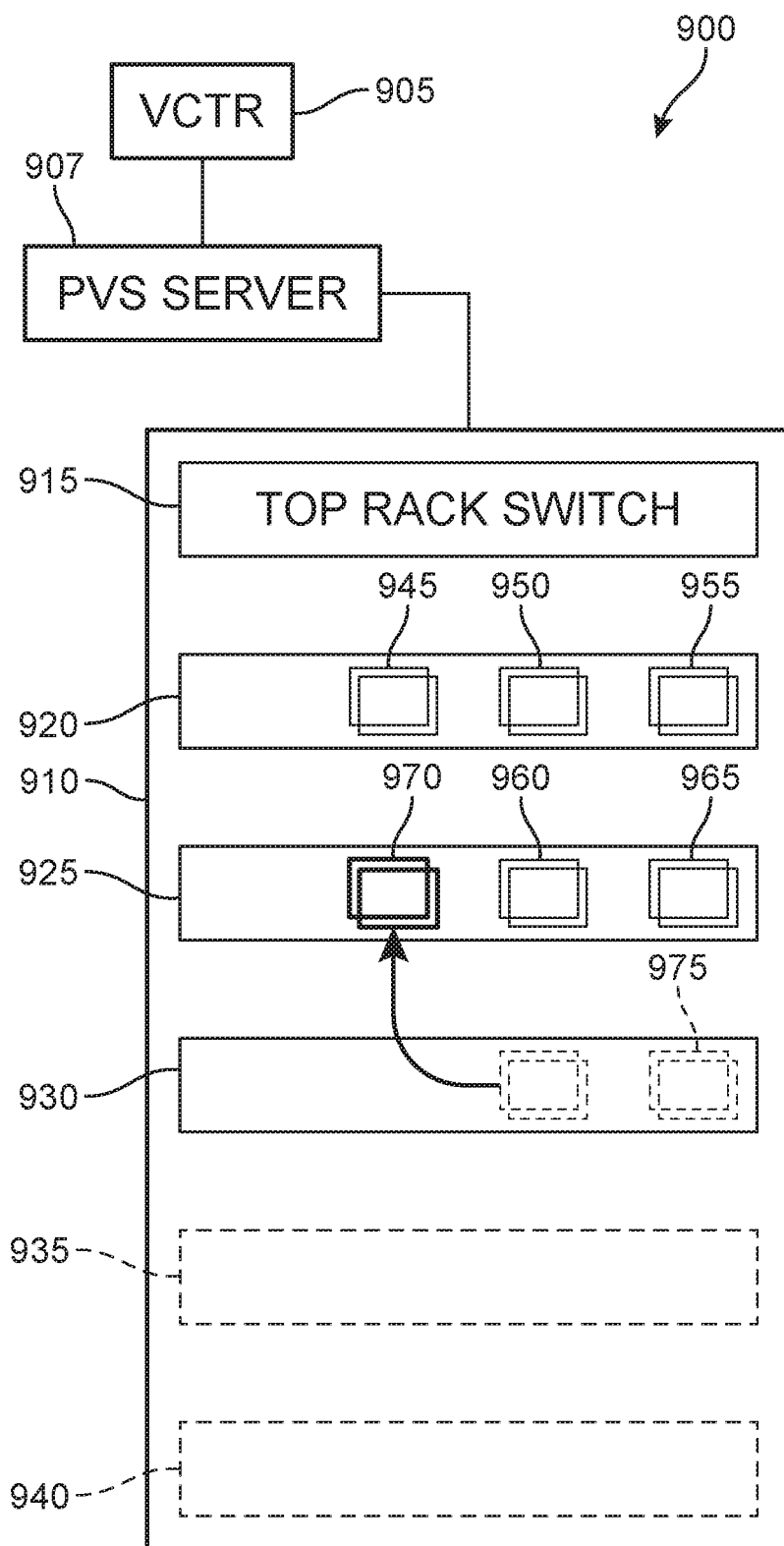
FIG. 10 is a schematic block diagram illustration of the system of FIG. 9 with a virtual machine moved from a first host server to a second host server and the first host server changed to an offline mode.

FIG. 10 is a schematic block diagram illustration of the system of FIG. 9 with one of the seven virtual machine sessions terminated from one of the host servers, and one of the virtual machine sessions moved from that host server to another host server and consolidated with other virtual machines. In particular, FIG. 10 shows seventh virtual machine 975 as being dashed, indicating that the session of seventh virtual machine 975 has been terminated, leaving only one virtual machine being hosted on third host server 930. FIG. 10 shows sixth virtual machine 970 moved from third host server 930 to second host server 925 in response.

While the system originally had three online servers hosting three, two, and two virtual machines, respectively, terminating one of the virtual machine sessions meant that the three online servers were hosting three, two, and one virtual machines, respectively. Accordingly, the system moved sixth virtual machine 970 from the third host server 930 to second host server 925 and powered down third host server. Accordingly, FIG. 10 shows third host server 930 with a dashed outline, indicating that third host server 930 has been changed to an offline mode. In some embodiments, the offline mode may be a low-power standby mode. In some embodiments, the offline mode may be a fully powered off mode. After this procedure, the system is operating two online servers, each with three virtual machines, rather than operating three online servers with three, two, and one virtual machine, respectively.

When additional virtual machines are requested to be hosted, the system may power up one or more host servers to accommodate the additional processing. Accordingly, the computer readable medium of the system controller includes instructions for powering up an additional host server to the online mode if hosting all requested virtual machines requires more than a predetermined amount of processing capacity from one or more host servers of the plurality of host servers.

Accordingly, the opposite of the process illustrated in FIG. 10 may be executed. That is, the computer readable medium of the system controller may include instructions for receiving commands to activate a hosting session of one or more virtual machines to be hosted on the plurality of host servers. Further, the computer readable medium of the system controller may include instructions for making a determination as to how much processing capacity is required of each of the plurality of host servers to host the active virtual machines following the activation of the hosting session of the one or more virtual machines. If hosting the active virtual machines requires more than a predetermined amount of processing capacity from one or more host servers of the plurality of host servers, an additional host server may be powered up from an offline mode in which the one or more host servers utilize a reduced amount of electrical power to an online mode in which the additional host server is fully powered up.

For example, if the starting condition of the system is as shown in FIG. 10, in which sixth virtual machine 970 is hosted on second host server 925 and third server 930 is in an offline mode, and the system is requested to host an additional virtual machine, third host server 930 may be powered up to host the additional virtual machine. Also, once third host server 930 is powered up, sixth virtual machine 970 may be The system may evaluate the available capacity of the host servers individually and/or collectively. Accordingly, in some embodiments, the determination as to how much processing capacity is required includes an evaluation of the collective processing capacity of all host servers in the online mode. This evaluation enables the system to determine how much total capacity will be available once a virtual machine session is terminated. If a large amount of total capacity will be available, the system may power down one or more host servers. In addition, this evaluation also enables the system to determine whether the currently online servers can handle the additional processing being requested. If not, the system may power up an additional server.

Figure 11:
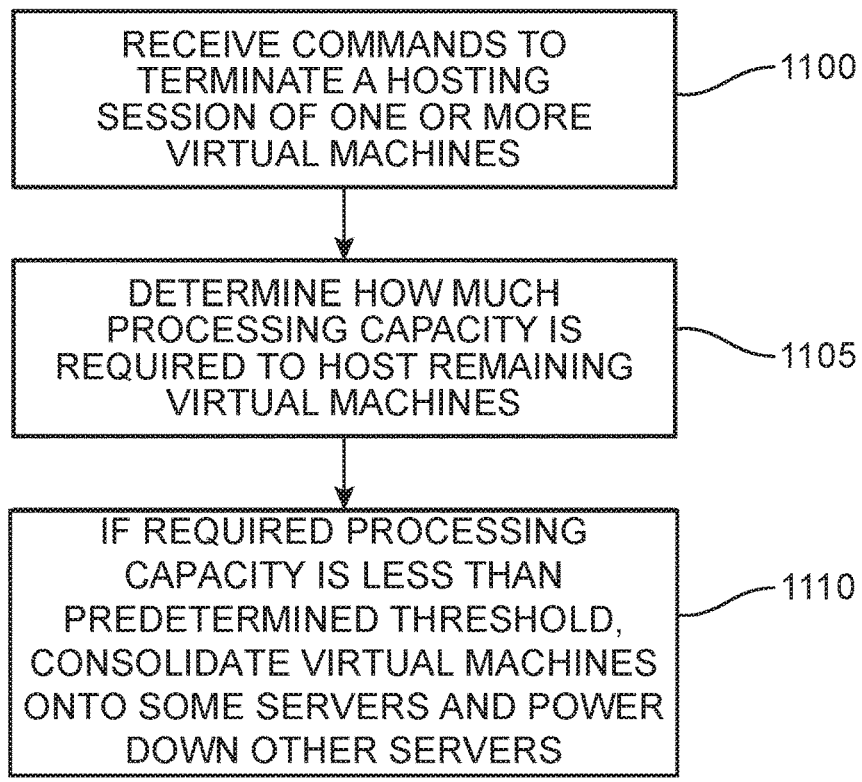
FIG. 11 is a flowchart illustrating a process of configuring the data processing system shown in FIGS. 9 and 10.

FIG. 11 is a flowchart illustrating a method of configuring the data processing system shown in FIGS. 9 and 10. As shown in FIG. 11, the method may include receiving commands, with a system controller networked with a plurality of host servers, to terminate a hosting session of one or more virtual machines hosted on the plurality of host servers, each host server including a device processor and a non-transitory computer readable medium including instructions stored thereon and executable by the processor. (Step 1100.) In addition, the method may include determining, with the system controller, as to how much processing capacity is required of each of the plurality of host servers to host the remaining virtual machines following the termination of one or more virtual machines. (Step 1105.) If hosting the remaining virtual machines requires less than a predetermined amount of processing capacity from one or more host servers of the plurality of host servers, the system controller moves all other processes from the one or more host servers to other host servers and changing the one or more host servers from which processes have been moved from an online mode in which the one or more host servers are fully powered up to an offline mode in which the one or more host servers utilize a reduced amount of electrical power. (Step 1110.)

In some embodiments, the method may also include the system controller substantially evenly distributing processes to all host servers that are in the online mode. In addition, the method may include receiving a request to begin an additional virtual machine session on the plurality of host servers and powering up an additional host server to the online mode if hosting the virtual machines requires more than a predetermined amount of processing capacity from one or more host servers of the plurality of host servers.

In some embodiments, the step of determining how much processing capacity is required may include evaluating the collective processing capacity of all host servers in the online mode.

Figure 12:
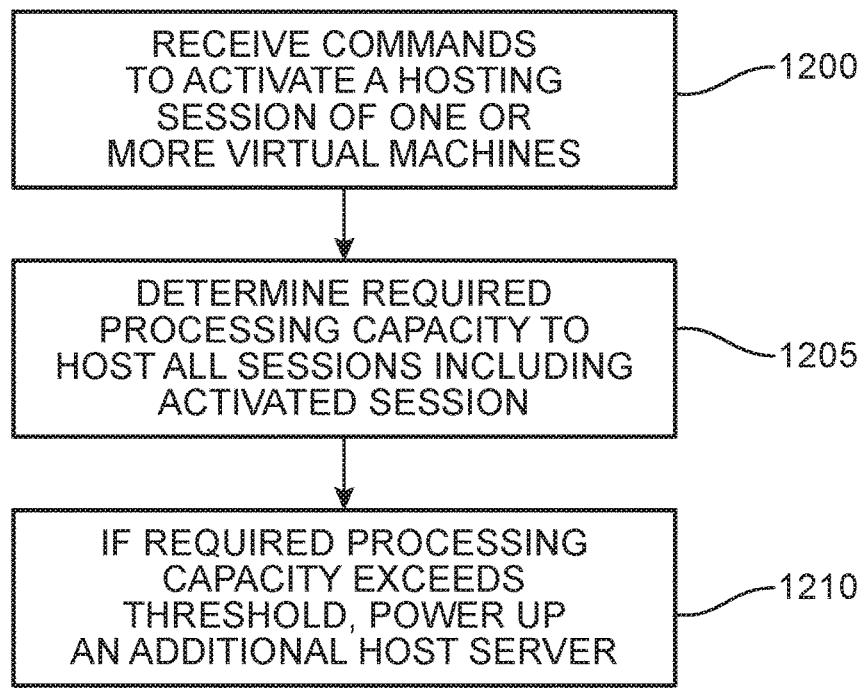
FIG. 12 is a flowchart illustrating another process of configuring the data processing system shown in FIGS. 9 and 10.

FIG. 12 is a flowchart illustrating another method of configuring the data processing system shown in FIGS. 9 and 10. As shown in FIG. 12, the method may include receiving commands, with a system controller networked with a plurality of host servers, to activate a hosting session of one or more virtual machines to be hosted on the plurality of host servers, each host server including a device processor and a non-transitory computer readable medium including instructions stored thereon and executable by the processor. (Step 1200.) In addition, the method may include determining, with the system controller, as to how much processing capacity is required of each of the plurality of host servers to host the virtual machines following the activation of the hosting session of the one or more virtual machines. (Step 1205.) If hosting the virtual machines, including the virtual machine to be activated, requires more than a predetermined amount of processing capacity from one or more host servers of the plurality of host servers, the method includes the system controller powering up an additional host server from an offline mode in which the additional host server utilizes a reduced amount of electrical power to an online mode in which the additional host server is fully powered up. (Step 1210.)

The present disclosure describes three general concepts of configuring a data processing system, namely grouping applications on servers based on inter-application communication, collecting virtual machines on servers based on commonalities between the virtual machines, and virtual desktop management (e.g., powering up or powering down servers based on processing demands). It will be understood that, in some embodiments, an exemplary data processing system may implement more than one of these three general concepts and, in some cases, an exemplary system may implement all three of these general concepts.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:
1. A data processing system, comprising:
a plurality of host servers, each server including a device processor and a non-transitory computer readable medium including instructions stored thereon and executable by the processor;
wherein the computer readable medium of each server includes instructions for running one or more virtual machines; and
wherein the plurality of host servers are networked in communication with one another;

the plurality of host servers including at least a first host server and a second host server;

a system controller networked with the plurality of host servers and including a controller processor and a non-transitory computer readable medium including instructions stored thereon and executable by the controller processor, wherein the computer readable medium of the system controller includes instructions for performing the following steps:

receiving commands to host two or more virtual machines, including a first virtual machine and a second virtual machine, on the plurality of host servers, the commands including instructions to host the first virtual machine on the first host server and instructions to host the second virtual machine on the second host server;

making a determination as to which of the two or more virtual machines share commonalities with one another; and based on a determination that the first virtual machine and the second virtual machine share one or more commonalities, providing instructions to the plurality of host servers to move the entire second virtual machine from the second host server to the first host server; and wherein the respective computer readable media of the plurality of host servers include instructions, executable by the respective processors of the plurality of host servers, for performing the following steps:

receiving the instructions to move the entire second virtual machine from the second host server to the first host server; and moving the entire second virtual machine from the second host server to the first host server;

wherein the computer readable medium of the system controller further includes instructions for:

making a determination as to whether the two or more virtual machines have one or more predetermined differences; and preventing virtual machines having one or more predetermined differences from running on the same host server; and wherein the predetermined differences are selected from the group including:

different levels of public interaction;

different levels of security restrictions; and different levels of sensitivity with respect to data processed by the virtual machines.

2. The system of claim 1, wherein the plurality of host servers are all disposed at the same facility.

3. The system of claim 1, wherein data having different levels of sensitivity include highly sensitive data and less sensitive data; and wherein the highly sensitive data includes at least one of financial data and medical records data.

4. The system of claim 1, wherein the determination as to which virtual machines share commonalities with one another is performed based on a listing, stored on one or more of the two or more virtual machines, of other virtual machines with which each virtual machine shares commonalities.

5. The system of claim 1, wherein the determination as to which virtual machines share commonalities with one another is performed based on data collected during operation of the two or more virtual machines regarding which other virtual machines each virtual machine communicates.

6. A data processing system, comprising:

a plurality of host machines, each host machine including a device processor and a non-transitory computer readable medium including instructions stored thereon and executable by the processor;

wherein the computer readable medium of each host machine includes instructions for running one or more virtual machines; and wherein the plurality of host machines are networked in communication with one another;

the plurality of host machines including at least a first host machine and a second host machine;

a system controller networked with the plurality of host machines and including a controller processor and a non-transitory computer readable medium including instructions stored thereon and executable by the controller processor, wherein the computer readable medium of the system controller includes instructions for performing the following steps:

receiving commands to host two or more virtual machines, including a first virtual machine and a second virtual machine, on the plurality of host machines, the commands including instructions to host the first virtual machine on the first host machine and instructions to host the second virtual machine on the second host machine;

making a determination as to which of the two or more virtual machines share commonalities with one another; and based on a determination that the first virtual machine and the second virtual machine share one or more commonalities, providing instructions to the plurality of host machines to move the entire second virtual machine from the second host machine to the first host machine;

wherein the respective computer readable media of the plurality of host servers include instructions, executable by the respective processors of the plurality of host servers, for performing the following steps:

receiving the instructions to move the entire second virtual machine from the second host machine to the first host machine; and moving the entire second virtual machine from the second host machine to the first host machine;

wherein the computer readable medium of the system controller further includes instructions for:

making a determination as to whether the two or more virtual machines have one or more predetermined differences; and preventing virtual machines having one or more predetermined differences from running on the same host machines;

wherein the predetermined differences are selected from the group including:

different levels of public interaction;

different levels of security restrictions; and different levels of sensitivity with respect to data processed by the virtual machines.

7. The system of claim 6, wherein the plurality of host machines are all disposed at the same facility.

8. The system of claim 6, wherein data having different levels of sensitivity include highly sensitive data and less sensitive data; and wherein the highly sensitive data includes at least one of financial data and medical records data.

9. The system of claim 6, wherein the determination as to which virtual machines share commonalities with one another is performed based on a listing, stored on one or more of the two or more virtual machines, of other virtual machines with which each virtual machine shares commonalities.

10. The system of claim 6, wherein the determination as to which virtual machines share commonalities with one another is performed based on data collected during operation of the two or more virtual machines regarding which other virtual machines each virtual machine communicates.

11. A method of configuring a data processing system, comprising:
  receiving commands, with a system controller, to host two or more virtual machines on a plurality of host machines networked in communication with one another, each host machine including a device processor and a non-transitory computer readable medium including instructions stored thereon and executable by the processor, the commands including instructions to host a first virtual machine on a first host machine and instructions to host a second virtual machine on a second host machine;
  making a determination, with the system controller, as to which of the two or more virtual machines share commonalities with one another;
  based on a determination that the first virtual machine and the second virtual machine share one or more commonalities, the system controller providing instructions to the plurality of host machines to move the entire second virtual machine from the second host machine to the first host machine;
  receiving the instructions, with the plurality of host machines, to move the entire second virtual machine from the second host machine to the first host machine; and
  moving the entire second virtual machine from the second host machine to the first host machine;
  further including making a determination as to whether the two or more virtual machines have one or more predetermined differences; and
  preventing virtual machines having one or more predetermined differences from running on the same host machine;
  wherein the predetermined differences are selected from the group including:
  different levels of public interaction;
  different levels of security restrictions; and
  different levels of sensitivity with respect to data processed by the virtual machines.

12. The method of claim 11, wherein data having different levels of sensitivity include highly sensitive data and less sensitive data; and
  wherein the highly sensitive data includes at least one of financial data and medical records data.

13. The method of claim 11, wherein the determination as to which virtual machines share commonalities with one another is performed based on a listing, stored on one or more of the two or more virtual machines, of other virtual machines with which each virtual machine shares commonalities.

14. The method of claim 11 wherein the determination as to which virtual machines share commonalities with one another is performed based on data collected during operation of the two or more virtual machines regarding which other virtual machines each virtual machine communicates.

* * * * *